United States Patent Office 3,103,624
Patented Sept. 10, 1963

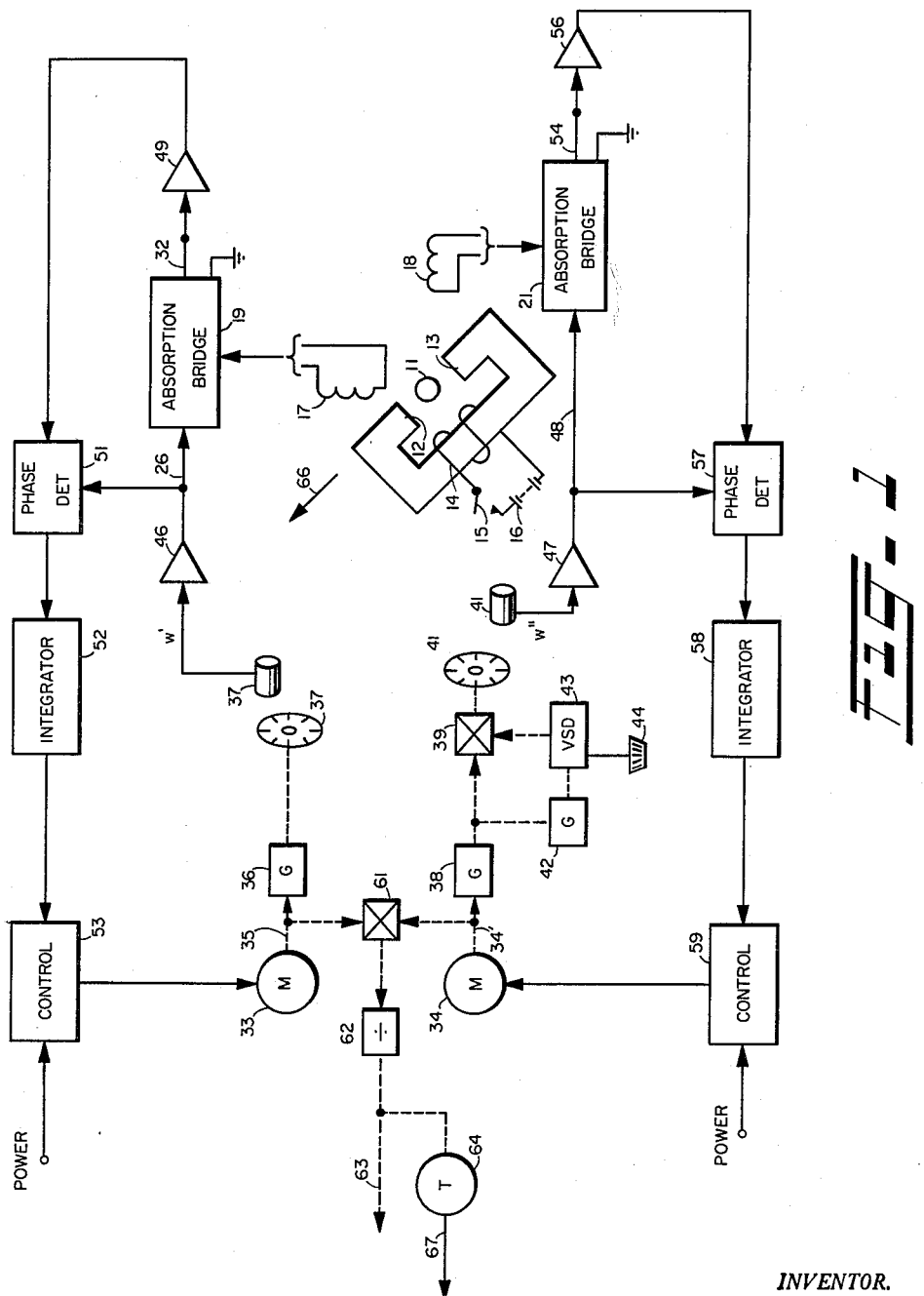

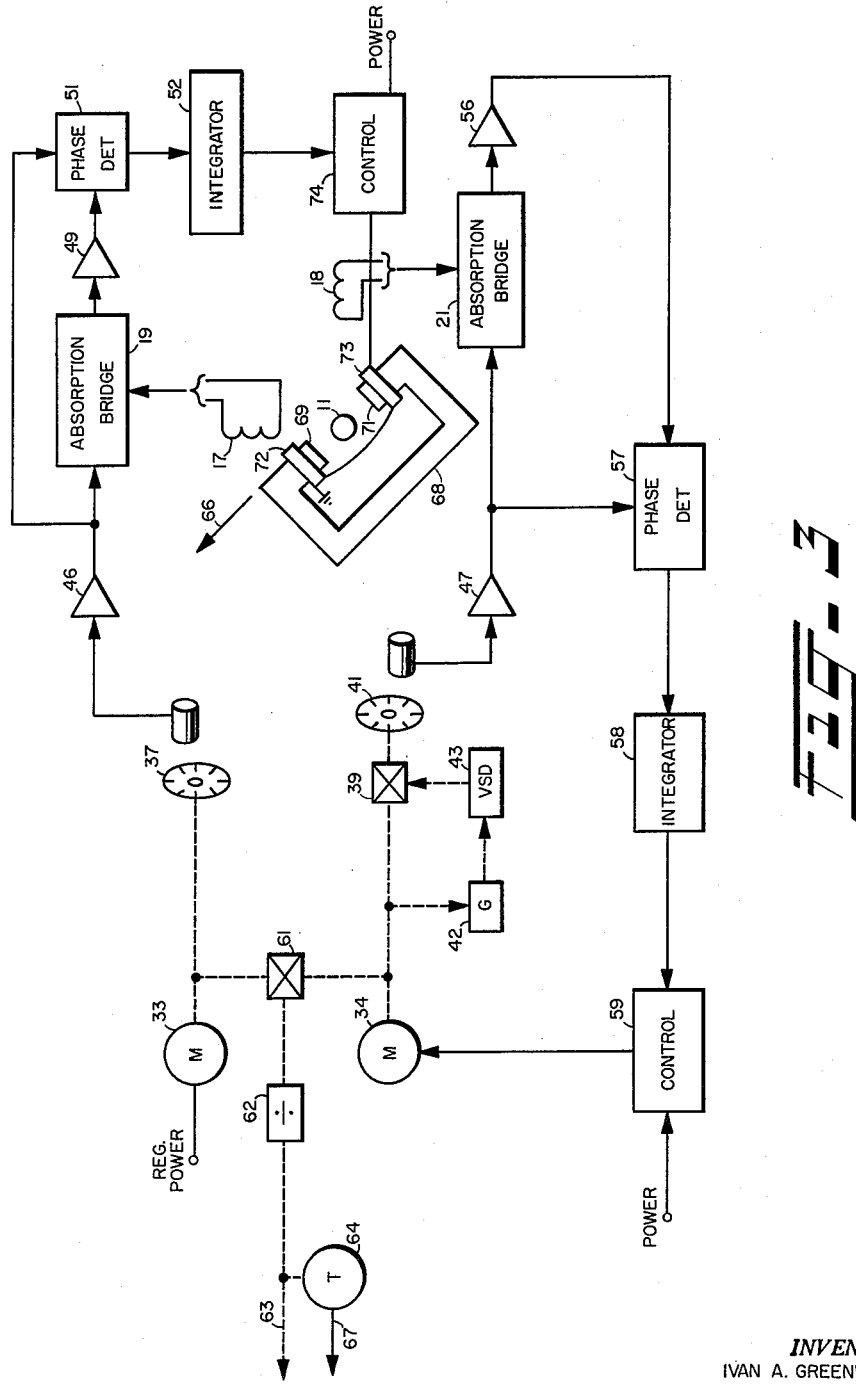

3,103,624
NUCLEAR GYROSCOPE
Ivan A. Greenwood, Jr., Stamford, Conn., John R. Lowdenslager, Ossining, N.Y., and James H. Simpson, Jr., Haledon, N.J., assignors to General Precision, Inc., a corporation of Delaware
Filed Apr. 20, 1960, Ser. No. 23,573
11 Claims. (Cl. 324—.5)

This invention relates to devices for sensing change of direction or rate of rotation relative to an inertial frame.

The invention makes use of the properties of molecules and of molecular and atomic particles, and particularly of properties of nuclei in a liquid or gas. More specifically the invention relates to such devices which simultaneously employ the properties of two kinds of particles in the same magnetic field, and which do not require independent knowledge of the precise strength of the magnetic field.

The invention provides an arrangement by which instrumentation to sense one degree of rotational freedom is coupled to an aggregation or sample containing two kinds of particles so as to discern changes in the instrument frame orientation and rotational speed relative to inertial space.

In this invention, a single homogeneous unidirectional magnetic field is employed. A single sample of material containing two kinds of particles, such as atomic nuclei, in close association and preferably in intimate association, is placed in the magnetic field. The sample is preferably fluid, that is, in gaseous or liquid form.

Any two kinds of particles can be employed which have observable magnetic moments and observable gyroscopic or angular moments or spin. The ratio of these two moments is commonly termed the magnetogyric ratio or, for nuclei, the nuclear constant, and is indicated by the symbol gamma ($\gamma$).

One way of describing the operation of the device of this invention is through the medium of the equation $$\theta = \frac{\phi_2 - \frac{\gamma_2}{\gamma_1}\phi_1}{1 - \frac{\gamma_2}{\gamma_1}} \quad (1)$$

in which $\theta$ is the angle of rotation of the apparatus about its input or sensitive axis relative to an inertial coordinate system, $\gamma_1$ and $\gamma_2$ are the constants of the nuclei used, and $\phi_1$ and $\phi_2$ are observed electrical phases. The term $$1 - \frac{\gamma_2}{\gamma_1}$$

should be as large as possible for maximum sensitivity of the device. Therefore, if the ratio $$\frac{\gamma_2}{\gamma_1}$$

be made as large as possible, and if $\gamma_1$ and $\gamma_2$ be of opposite signs, the instrument will be most sensitive.

It is, of course, understood that the effective nuclear constant, or effective gamma, is sometimes different from the magnetogyric ratio as defined because of such effects as chemical shift, and the effective values must be used in calculations for highest accuracy.

Examples of pairs of atomic nuclei which are suitable for use in this invention include nuclei of hydrogen and fluorine, having the nuclear constants of 4257 cycles per second per gauss (c.p.s.p.g.) and 4006 c.p.s.p.g. respectively. These nuclei may be employed in the form of a water solution of trifluoroacetic acid. Other pairs include the nuclei of hydrogen and phosphorus (1723 c.p.s.p.g.) in a water solution of orthophosphoric acid, and the nuclei of deuterium (653.6 c.p.s.p.g.) and hydrogen in a mixture of heavy and ordinary water. Although these nuclear pairs are especially suitable, other pairs may be used instead in this invention.

The two kinds of particles employed in each of the described embodiments consist of two kinds of atomic nuclei. However, it is possible to employ any class of particles which possesses the two properties of spin and magnetic moment. As a further example, one kind of nucleus can be employed as one of the two particles and the electron can be employed as the other particle. This does not change the principle of operation of the apparatus of the invention, but changes only the frequencies of resonant elements and the magnitudes of components affecting frequency.

The invention provides apparatus for deriving nuclear magnetic resonance signals from the two kinds of nuclei in the sample. The apparatus of the invention then derives from these two signals a single signal or indication representing angular change of position of the apparatus, or rate of change, relative to inertial or fixed star coordinates. In this operation any requirement for independent knowledge of the absolute magnetic field magnitude is eliminated and variations in the field strength have no first-order effect on the accuracy of the output. This is of extreme practical importance and it is the simultaneous use of two different kinds of nuclei which permits it.

That portion of the invention which derives the two nuclear magnetic resonance signals from the two kinds of atomic nuclei in the sample may employ any method, including forced precession and free precession methods. For example, the absorption bridge of Purcell as described in the first edition of Nuclear Magnetic Resonance, by E. R. Andrews, may be used. Alternatively, the device may employ the induction method as described in Patent No. Re. 23,950 of Bloch. In either of these methods the nuclei may be excited by the outputs of oscillators, or a regenerative feedback system such as described in the Hershberger Patent No. 2,589,494 may be employed, eliminating the need for separate oscillators.

In that portion of the apparatus of the invention which derives the output signal from the two nuclear magnetic resonance signals, phases rather than frequencies are compared because of the extreme accuracy required. An error signal is derived from one of the nuclear magnetic resonance signals and is made to control either the unidirectional magnetic field strength or the alternating magnetic field frequency. From the other nuclear magnetic resonance signal a phase difference signal is derived which is employed in securing the desired output quantity.

One purpose of this invention is to measure the orientation of a body relative to an inertial axis by employing the gyroscopic property of atomic nuclei.

Another purpose of this invention is to provide an arrangement whereby the gyroscopic properties of two kinds of nuclei, immersed in a single magnetic field, are simultaneously utilized to measure the orientation in one plane of a body relative to inertial space axes.

A further understanding of this invention may be secured from the detailed description and drawings, in which:

FIGURE 1 is a schematic drawing of an embodiment of the invention employing forced precession, separate generators, absorption bridges and control of generator speeds.

FIGURE 3 is an embodiment of the invention employing forced precession, separate generators, absorption bridges and control of field strength.

Figure 4:
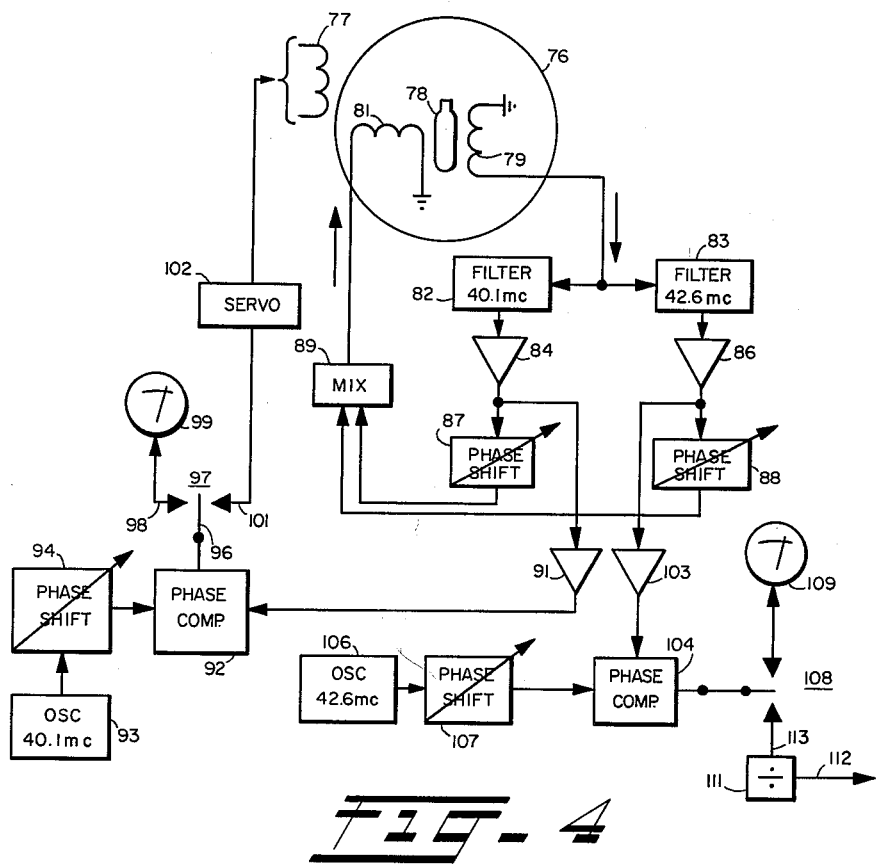
FIGURE 4 is an embodiment of the invention employing forced precession and the Bloch induction method, excitation by spin generators, and feedback control of the field.

Referring now to FIG. 1, a flask 11 contains trifluoracetic acid in water solution. In this solution the atomic nuclei which are to be employed are those of fluorine and of hydrogen. A constant magnetic field of 235 gauss is applied to the sample as schematically indicated by the magnetic structure having poles 12 and 13, the energizing coil 14, the switch 15 and the source 16. Two coils 17 and 18 closely surround the flask 11. These coils are positioned mutually at right angles and at right angles to the direction of the magnetic field. Coil 17 is connected to a bridge absorption circuit 19 and coil 18 is connected to a bridge absorption circuit 21 which is identical to that of circuit 19 except that it is tuned to a different frequency.

Figure 2:
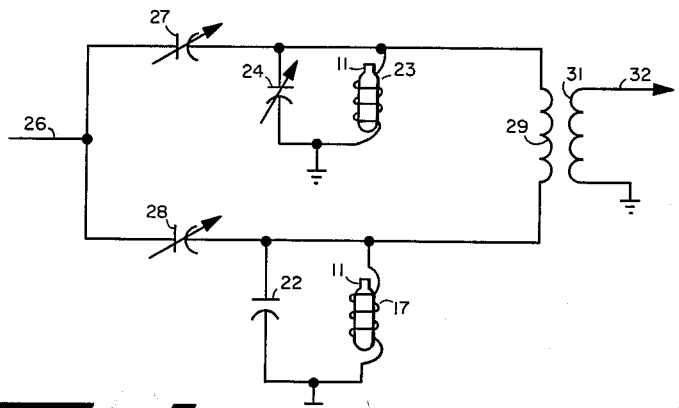
FIGURE 2 is a schematic diagram illustrating the construction of the absorption bridges.

The circuit of bridge 19 is shown in FIG. 2. The coil 17 surrounding the sample flask 11 is resonated with a capacitor 22 to a frequency $\omega'$. The coil 23 and capacitor 24 constitute a dummy resonant circuit, also tuned to the same frequency, $\omega'$. The coil 23 is wound around a dummy sample in a flask, 11′, like flask and sample 11 in all respects except that it is not in the magnetic field.

An input conductor 26 is coupled through two adjustable coupling capacitors, 27 and 28, to the two resonant circuits in parallel. A transformer primary winding, 29, connects one terminal of one resonant circuit with one terminal of the other resonant circuit, the other resonant circuit terminals being grounded. The transformer secondary winding, 31, is grounded at one end and its other end is connected to the output conductor 32.

Returning to FIG. 1, two adjustable speed motors 33 and 34 are arranged to be run at approximately the same speed. Motor 33 operates, through gears 36, an optical tone wheel 37 including an optical sensor 37′, comprising a photocell. Motor 34 operates, through gears 38 and differential gear 39, an optical tone wheel 41 including an optical sensor 41′. The gear ratios of step-up gear boxes 36 and 38 and the number of teeth on the tone wheels are so arranged that the outputs from the pick-up coils 37′ and 41′ have approximately the frequencies $\omega'$ and $\omega''$. In place of this arrangement, however, the gears may be omitted and the optical tone wheel slits increased in number. A stepdown gear 42 is energized from the output of gear 38 and drives a variable speed drive 43, which may be of the ball and disc type. The variable speed drive 43 output drives the third terminal of the differential 39 and is manually adjustable by means of the knob 44, thus providing a means for small adjustments of the speed of tone wheel 41. This adjustment is necessary because it will not be possible otherwise to make the ratio of the frequencies $\omega'$ and $\omega''$ exactly equal to the ratio of the nuclear constants. When the selected frequencies, $\omega'$ and $\omega''$, are high it may be convenient to operate the generators at lower frequencies and step their outputs up in frequency multipliers. The generator outputs are amplified in amplifiers 46 and 47 and applied through conductors 26 and 48 to the two absorption bridges 19 and 21.

The output or absorption bridge 19, at conductor 32, is amplified in amplifier 49 and applied to a circuit controlling the speed of motor 33. This circuit includes a phase detector 51 securing its reference phase from amplifier 46 and emitting a direct current error signal. This signal is applied to an integrator 52 having a direct-current voltage level controlled by the error signal. This voltage level is in turn applied to a control circuit 53 which adjusts the motor speed in accordance with the voltage level. The output of absorption bridge 21, at conductor 54, is amplified in an amplifier 56. The resulting signal is applied to a phase detector 57 referenced to the output of amplifier 47. The phase detector error signal is applied to an integrator 58, the output voltage level of which controls, through control circuit 59, the speed of motor 34.

The shafts of motors 33 and 34 are connected to a subtracting differential gear, 61, the output of which is divided in a dividing element 62, which may consist simply of a selected speed-reduction gear. The angular shaft deflection output thereof at shaft 63 constitutes the space phase output of the instrument.

A second output representing the rate of rotation of the instrument is easily secured by operating a tachometer generator, 64, from shaft 63. The voltage output of this generator is proportional to the rate of rotation of shaft 63, and represents the space rate of rotation of the instrument about its magnetic field direction 66, relative to an inertial reference datum.

Operation of the circuit of FIG. 1 is based on Equation 1. This equation is derived from the statement of Larmor nuclear precessional frequency.

$$\omega_{L1} = \gamma_1 H \qquad (2)$$

in which H is the unidirectional field strength, for example, that applied to the sample 11, FIG. 1, by the poles 12 and 13. $\omega_{L1}$ represents the Larmor frequency. When the apparatus has a rate of rotation, $\omega$, about the direction of the unidirectional field, the frequency observed by an observer rotating with the apparatus is not $\omega_{L1}$, but another frequency, $\omega_1$, which is determined by the expression $$\omega_1 = \gamma_1 H + \omega \qquad (3)$$

The observed precession frequency of a second kind of nucleus is $$\omega_2 = \gamma_2 H + \omega \qquad (4)$$

Solving for $\omega$, $$\omega = \frac{\gamma_1}{\gamma_1 - \gamma_2}\omega_2 - \frac{\gamma_2}{\gamma_1 - \gamma_2}\omega_1 \qquad (5)$$

It is to be noted that the magnetic field strength, H, does not appear in this equation.

In a circuit such as that of FIG. 1, the observed frequencies $\omega_1$ and $\omega_2$ at the outputs of coils 17 and 18 can be measured and, applying Equation 5, $\omega$ will be found. However, the very small difference between $\omega_{L1}$ and $\omega_1$ makes phase measurement more practical than frequency measurement. Therefore the instrumentation of FIG. 1 is designed to employ phase measurement and comparison.

By integrating Equation 5, the rates of rotation $\omega$, $\omega_1$, and $\omega_2$ are transformed to equivalent angular displacements $\theta$, $\phi_1$, and $\phi_2$ and Equation 5 is transformed to the form given in Equation 1. This is instrumented in the circuit of FIG. 1.

The Purcell absorption bridge of FIG. 2 can be balanced either to emit an absorption signal having a resonant peak at the resonant frequency of the kind of nucleus employed, or to emit a dispersion signal having a discriminator type of amplitude-frequency characteristic, with zero alternating-current error signal output at the resonant frequency. The adjustments of the bridge in these two modes of operation are fully described in chapter 3 of the book Nuclear Magnetic Resonance, supra. In this invention the bridges are balanced to emit absorption signals.

In the operation of FIG. 1, the field switch 15 is at first opened and the speeds of motors 33 and 34 are adjusted until the generator frequencies, $\omega'$ and $\omega''$, equal 940 kc. p.s. and 1000 kc. p.s. respectively. In the absorption bridge 19 (vide FIG. 2) the two resonant circuits are adjusted to resonate at 940 kc. p.s. and capacitor 24 is adjusted until the phases of the two resonant circuit outputs are equal. The capacitors 27 and 28 are now adjusted for equal amplitude of signals applied to the transformer primary winding 29. Since the phases and amplitudes are now equal at the transformer, no current flows in it and zero signal is observed at conductor 32. When the magnetic field is produced by closing switch 15, and adjusted to 235 gauss, nuclear resonance causes damping of the resonant circuit 17/22, reducing its terminal potential, so that a potential appears at conductor 32. This potential signal is thus an indication of nuclear resonance. By the described adjustment of the absorption bridge 19, the signal in conductor 32 is maximum at the exact point of nuclear resonance.

Bridge 21 is adjusted in the same manner so that the same type of potential signal is secured in conductor 54.

The signals at conductors 32 and 54 are alternating at substantially the generator frequencies. When passed through phase detectors 51 and 57, discriminator-like direct-current error signals are secured representing by amplitude and sign the difference between the generator frequency and the nuclear magnetic resonance signal frequency. This error signal, for example that from phase detector 51, is integrated and applied to change the speed of motor 33 in such direction as to make the generator frequency equal to the nuclear magnetic resonance frequency, when the error signal disappears and the loop is nulled.

The loop including phase detector 57 and motor 34 is nulled in the same manner.

Now assume that the instrument frame is stabilized or otherwise fixed relative to inertial axes. Since the output frequencies of the tone wheels 37 and 41 are in the ratio of $\gamma_1/\gamma_2$, the motors 33 and 34 rotate at the same speeds and there is zero differential output from the differential gear 61. Additionally, the shaft positions or phase angles, $P_1$ and $P_2$, of the shafts 33' and 34' of motors 33 and 34 have a constant ratio to each other, and represent the electrical phases of the generator outputs multiplied by the nuclear constant ratio. That is $$P_2 - P_1 = \phi_2 - \frac{\gamma_2}{\gamma_1}\phi_1 \qquad (6)$$

The position assumed by the output shaft 63 of the divider 62 is therefore the zero or datum reference position of the output representing in Equation 1 the value $\theta = 0$.

Now assume that the instrument is given rotational freedom about the field direction 66 relative to inertial space. Now Equations 3 and 4 apply and are to be satisfied by changing the generator frequencies. These equations show that the generator 37 frequency $\omega_{L1}$ is no longer equal to the Larmor frequency $\gamma_1 H$, and the loop operates to change the generator to a new frequency, $\omega_1$, satisfying Equation 3. Similarly, an error signal will appear at conductor 54 which is fed back to change the speed of motor 34 and generator 41 so that its frequency is changed from $\omega_{L2}$ to $\omega_2$.

Equation 1 gives the relative phases, $\phi_1$ and $\phi_2$, of the generators 37 and 41 when the loops are nulled. Subtraction of these phases is accomplished by the differential gear 61, so that the angular shaft deflection of its output represents the numerator of Equation 1. Division by the denominator term is accomplished in the divider 62, and the output shaft, 63, therefore has an angular deflection $\theta$. The rate of rotation of this shaft is represented by the potential at conductor 67, and represents $\omega$, Equation 5.

If desired, one of the absorption bridge circuits can be balanced by feedback through the magnetic field rather than by feedback through the motor control. This form of feedback balance circuit is shown in FIG. 3. The gears 36 and 38, FIG. 1, have been omitted and the ratio of the optical tone wheel segments has been made equal to $$\frac{\gamma_2}{\gamma_1}$$

The motor 33, driving the optical tone wheel 37, is maintained highly constant in speed and the speed of motor 34 is initially adjusted to be nominally equal. The frequencies of the outputs of the optical tone wheels 37 and 41 applied to amplifiers 46 and 47 are constant at 940 kc. p.s. and 1000 kc. p.s. The absorption bridges 19 and 21 are connected to the nuclear absorption coils 17 and 18 surrounding the nuclear sample 11 containing trifluoracetic acid solution. The magnetic field is supplied by a structure indicated by the yoke 68. In this case the pole pieces 69 and 71 are made of soft iron and are provided with coils 72 and 73 connected together and to a control circuit 74. These coils are arranged in aiding connection so that when direct current is applied to them they either increase or decrease the magnetic field strength of the structure 68 above or below 235 gauss at the sample 11. The two bridges 19 and 21, in combination with the phase detectors 51 and 57, are adjusted to give discriminator-like outputs, as described in connection with FIG. 1. The output of bridge 19, after amplification in amplifier 49, is applied through phase detector 51 and integrator 52 to the control circuit 74. The output of bridge 21, after amplification in amplifier 56 is phase detected in detector 57 referenced to the output of amplifier 47, and the output after integration in integrator 58 is applied through the control circuit 59 to control the speed of motor 34.

In the operation of the circuit of FIG. 3, the speed of motor 33 is exactly controlled and the field strength is adjusted by feedback to the value H so that, in the absence of rotation of the device relative to fixed axes, the relation of Equation 2 is satisfied. When space rotation occurs, this motor speed is maintained but the field strength H is further changed by the feedback operation to H' so that $$\omega_{L1} = \gamma_1 H' + \omega \qquad (7)$$

and $$\omega_{L2} = \gamma_2 H' + \omega \qquad (8)$$

From these equations, by integration, Equation 1 is again derived, $\phi_1$ and $\phi_2$ being the relative phase shifts at null of the tone wheel 37 and 41 outputs. When, by the feedback operation of the loops, the phase detector output error signals have been reduced to zero, the difference in the positions of the motor shafts will represent the numerator of Equation 1 and, after dividing by the denominator term in divider 62, the angular position of the shaft 63, measured from a datum value, represents $\theta$.

FIG. 4 depicts a circuit employing the Bloch induction method of securing nuclear magnetic resonance signals combined with the spin generator method of exciting the nuclei. The disc 76 represents one pole face of a magnetic field generator having a nominal field gap strength of 10,000 gauss, the direction of the unidirectional magnetic field being perpendicular to the paper. The magnetic field must be as homogeneous as possible, that is, of the same intensity at all points of the pole face at and near the sample. The magnetic system is provided with a trimming or bias coil 77 by means of which the field strength in the working gap can be increased or decreased. Another pole face, not shown, cooperates with that shown to produce the magnetic field in the working space occupied by the nuclear sample.

The nuclear sample contained in tube 78 consists of a water solution of trifluoracetic acid. The fluorine constant is 4006 c.p.s.p.g. and the proton constant is 4,257 c.p.s.p.g.

A receiving coil 79 and transmitting coil 81 are placed near the nuclear sample. These coil axes are perpendicular to each other and balanced so that they have no electrical or magnetic coupling, and are also perpendicular to the direction of the unidirectional field of the pole face 76. The receiving coil 79 is connected to two bandpass filters 82 and 83 having narrow transmission bands centered at 40.1 mc. p.s. and 42.6 mc. p.s., respectively. The filter outputs are amplified in amplifiers 84 and 86 and applied to manually-adjusted phase-shift circuits 87 and 88. These phase-shift circuits are identical and permit a small amount of phase adjustment to compensate for unavoidable small phase shifts in the amplifier, filter, and other parts of the loop circuit. The phase-shift circuit outputs are combined in a mixing circuit 89 without intermodulation, so that the frequencies of 40.1 mc. p.s. and 42.6 mc. p.s. exist in the mixer output, and no others are present. This output is applied to the transmitting coil 81.

The components so far described constitute two closed, feedback loops with the coils 79 and 81, and mixer 89, in common. These loops operate regeneratively, as will be described, and each constitutes a spin generator.

One loop is tapped at the output of amplifier 84 and the signal at this point is applied, through an additional amplifier 91, to a phase comparator 92. An oscillator 93 tuned to the Larmor frequency of 40.1 mc. p.s. is connected through an adjustable phase shifter 94 to the phase comparator 92. The output of the phase comparator 92 is connected to the arm 96 of a 2-position switch 97. One fixed contact 98 is connected to an indicating meter 99 and the other fixed contact 101 is connected, through a servo amplifier and integrator 102, to the bias coil 77.

The other loop is tapped at the output of amplifier 86 and the signal at this point, after further amplification in amplifier 103, is applied to a phase comparator 104. An oscillator 106 tuned to the Larmor frequency of 42.6 mc. p.s. is connected through an adjustable phase shifter 107 to the phase comparator 104, the output of which is connected to a 2-position switch 108. In one position the switch connects the output to an indicating meter 109 and in the other position through a dividing circuit 111 to the instrument output conductor 112.

In the operation of the circuit of FIG. 4, electrical noise in the output of filter 82 within its transmission band is greatly amplified in amplifier 84 and presented to the transmitting coil 81. The signal frequency band includes the fluorine Larmor frequency of 40.1 mc. p.s. and therefore excites the fluorine nuclei slightly. This causes a slight amount of coupling of the nuclear energy to the receiving coil 79. This energy, at the Larmor frequency of 40.1 mc. p.s., augments the noise output at that frequency. The phase relations in the closed loop being correct for regeneration, the signal strength builds to a maximum in the loop.

Similarly, the closed regenerative loop including the filter 83 and the proton aggregate in the sample builds a signal at 42.6 mc. p.s.

A portion of the 40.1 mc. p.s. signal, further amplified in amplifier 91, is applied to the phase comparator 92. With the instrument assumed or held non-rotating relative to the inertial space axes, and with the switch 97 placed in its "adjust" position at contact 98, the phase shifter 94 is carefully adjusted until the phases of the two inputs to comparator 92 are equal as shown by the indicating meter. The phase shifter 94 is kept at this adjustment and its output henceforth serves as a phase reference.

Similarly, a portion of the 42.6 mc. p.s. signal is further amplified in amplifier 103 and applied to comparator 104. The switch 108 is put in its "adjust" position, connecting the phase comparator output to the meter 109. The phase shifter 107 is now adjusted to the phase at which no output is indicated by meter 109, showing that the inputs to the comparator 104 have equal phases. The output of phase shifter 107 henceforth serves, with this setting, as a phase reference.

The instrument is now permitted to be free to rotate relative to inertial space axes in the plane of the magnetic pole face 76, and the switches 97 and 108 are moved to their "operate" positions 101 and 113, respectively. In accordance with the relationship of Equation 7, the magnetic field present at the pole face 76 is caused by the bias coil 77 to assume a new value such that this equation is satisfied, whereupon the output at conductor 112 will indicate a value representative of the change in the instrument space angle $\theta$ from the zero condition in accordance with Equation 1.

What is claimed is:

1. A nuclear gyroscope comprising, means for producing a unidirectional magnetic field having a selected direction, a single sample of fluid material containing two selected kinds of atomic nuclei positioned in said magnetic field, means for producing a pair of nuclear magnetic resonance signals from said nuclei, each nuclear magnetic resonance signal having a frequency nominally equal to the Larmor frequency of the kind of nuclei from which it is derived, a first oscillation generator producing a first output signal having a frequency substantially equal to the Larmor frequency of one of said kinds of nuclei, a second oscillation generator producing a second output signal having a frequency substantially equal to the Larmor frequency of the other of said kinds of nuclei, negative feedback loop means for bringing the frequency and phase of one of said output signals and the frequency and phase of one of said pair of nuclear magnetic resonance signs into equality, means associated with said last-named means for controlling the frequency and phase of the other of said nuclear magnetic resonance signals, and phase comparison means comparing the phase of one of said oscillation generators with a reference phase signal to generate a system output signal proportional to the phase difference thereof and representative of the angle between a direction in space and said selected direction.

2. A gyroscope comprising, a magnetic structure including an airgap, means for producing a unidirectional magnetic field across said airgap, a single sample of fluid material containing two selected kinds of atomic nuclei positioned in said airgap, each said kind of atomic nuclei having observable spin and magnetic moment, means for producing two nuclear magnetic resonance signals from said two selected kinds of atomic nuclei, said two nuclear magnetic resonance signals having different frequencies each nominally equal to the frequency of precession in said field of the kind of nucleus from which derived, a first oscillation generator producing a first signal having a frequency substantially equal to the frequency of precession of one of said kinds of nuclei, a second oscillation generator producing a second signal having a frequency substantially equal to the frequency of precession of the other of said kinds of nuclei, negative feedback loop means for bringing the frequency and phase of said first signal and the frequency and phase of precession of one of said kinds of nuclei into equality, means associated with said loop means for conjointly comparing the frequency and phase of said second signal with the frequency and phase of precession of the other of said kinds of nuclei, and phase comparison means comparing the phase of one of said oscillation generators with a reference phase signal to generate a system output signal proportional to the phase difference thereof and representative of the angle between a direction in space and said selected direction.

3. A gyroscope comprising, means for producing a unidirectional magnetic field having a selected direction, a single sample of fluid material containing two selected kinds of atomic nuclei positioned in said magnetic field, means for producing a pair of nuclear magnetic resonance signals from said nuclei, each nuclear magnetic resonance signal having a frequency nominally equal to the Larmor frequency of the kind of nuclei from which it is derived, a first oscillation generator producing a first output signal having a frequency substantially equal to the Larmor frequency of one of said kinds of nuclei, a second oscillation generator producing a second output signal having a frequency substantially equal to the Larmor frequency of the other of said kinds of nuclei, feedback loop means for bringing the frequencies of said output signals and the frequencies of respective ones of said pair of nuclear magnetic resonance signals into equality, and means comparing the phases of said first and second oscillation generators to produce a system output signal proportional to the phase difference thereof.

4. A gyroscope comprising, means for producing a unidirectional magnetic field having a selected direction, a single sample of fluid material containing two selected kinds of atomic nuclei positioned in said magnetic field, means for producing a pair of nuclear magnetic resonance signals from said nuclei, each nuclear magnetic resonance signal having a frequency nominally equal to the Larmor frequency of the kind of nuclei from which it is derived, a first oscillation generator producing a first output signal having a frequency substantially equal to the Larmor frequency of one of said kinds of nuclei, a second oscillation generator producing a second output signal having a frequency substantially equal to the Larmor frequency of the other of said kinds of nuclei, first negative feedback loop means bringing the frequency and phase of said first output signal and the frequency and phase of the respective one of said pair of nuclear magnetic resonance signals into equality, second negative feedback loop means controlling the frequency and phase of said second output signal to equal the frequency and phase of the respective one of said pair of nuclear magnetic resonance signals, and means comparing the phases of said first and second oscillation generators to produce a system output signal proportional to the phase difference thereof and representative of the angle between a direction in space and said selected direction.

5. A gyroscope comprising, means for producing a unidirectional magnetic field having a selected direction, a single sample of fluid material containing two selected kinds of atomic nuclei positioned in said magnetic field, means for producing a pair of nuclear magnetic resonance signals from said nuclei, each nuclear magnetic resonance signal having a frequency nominally equal to the Larmor frequency of the kind of nuclei from which it is derived, a first oscillation generator producing a first output signal having a frequency substantially equal to the Larmor frequency of one of said kinds of nuclei, a second oscillation generator producing a second output signal having a frequency substantially equal to the Larmor frequency of the other of said kinds of nuclei, feedback loop means for changing the frequencies of said output signals into equality with the frequencies of respective ones of said pair of nuclear magnetic resonance signals, and means comparing the phases of said first and second oscillation generators to produce a system output signal proportional to the phase difference thereof.

6. A gyroscope comprising, means for producing a unidirectional magnetic field having a selected direction, a single sample of fluid material containing two selected kinds of atomic nuclei positioned in said magnetic field, means for producing a pair of nuclear magnetic resonance signals from said nuclei, each nuclear magnetic resonance signal having a frequency nominally equal to the Larmor frequency of the kind of nuclei from which it is derived, a first oscillation generator producing a first output signal having a frequency substantially equal to the Larmor frequency of one of said kinds of nuclei, a second oscillation generator producing a second output signal having a frequency substantially equal to the Larmor frequency of the other of said kinds of nuclei, first negative feedback loop means controlling the frequency and phase of said first control signal to equal the frequency and phase of the nuclear magnetic resonance signal from said one kind of nuclei, second negative feedback loop means controlling the frequency and phase of said second control signal to equal the frequency and phase of the nuclear magnetic resonance signal from said other kind of nuclei, and means comparing the phases of said first and second oscillation generators to produce a system output signal proportional to the phase difference thereof and representative of the angle between a direction in space and said selected direction.

7. A gyroscope comprising, means for producing a unidirectional magnetic field having a selected direction, a single sample of fluid material containing two selected kinds of atomic nuclei positioned in said magnetic field, means for producing a pair of nuclear magnetic resonance signals from said nuclei, each nuclear magnetic resonance signal having a frequency nominally equal to the Larmor frequency of the kind of nuclei from which it is derived, a first oscillation generator producing a first output signal having a frequency substantially equal to the Larmor frequency of one of said kinds of nuclei, a second oscillation generator producing a second output signal having a frequency substantially equal to the Larmor frequency of the other of said kinds of nuclei, first negative feedback loop means controlling the frequency and phase of the nuclear magnetic resonance signal from one kind of said two selected kinds of atomic nuclei to equal the frequency and phase of said first output signal, second negative feedback loop means controlling the frequency and phase of said second output signal to equal the frequency and phase of the nuclear magnetic resonance signal from the other of said two selected kinds of atomic nuclei, and means comparing the phases of said first and second oscillation generators to produce a system output signal proportional to the phase difference thereof and representative of the angle between a direction in space and said selected direction.

8. A gyroscope in accordance with claim 7 in which said first negative feedback loop means adjusts the frequency and phase of the nuclear magnetic resonance signal from the other of said two selected kinds of atomic nuclei concomitantly and in proportion to the said adjustment of the frequency and phase of the nuclear magnetic resonance signal from one kind of two selected kinds of atomic nuclei.

9. A gyroscope comprising, means for producing a unidirectional magnetic field having a selected direction, a single sample of fluid material containing two selected kinds of atomic nuclei positioned in said magnetic field, means for producing a pair of nuclear magnetic resonance signals from said nuclei, each nuclear magnetic resonance signal having a frequency nominally equal to the Larmor frequency of the kind of nuclei from which it is derived, a first oscillation generator producing a first output signal having a frequency substantially equal to the Larmor frequency of one of said kinds of nuclei, a second oscillation generator producing a second output signal having a frequency substantially equal to the Larmor frequency of the other of said kinds of nuclei, negative feedback loop means bringing the frequency and phase of one of said nuclear magnetic resonance signals to equal the frequency and phase of said first output signal, said means concomitantly changing the frequency and phase of the other of said nuclear magnetic resonance signals in proportion to the change in the one said nuclear magnetic resonance signal, and comparison means comparing the phase of one of said output signals with a reference to generate a system output signal proportional to the phase difference thereof representative of the angle between a direction in space and said selected direction.

10. A gyroscope comprising means for producing a unidirectional magnetic field having a selected direction, a single sample of fluid material containing two selected kinds of atomic nuclei positioned in said magnetic field, means for producing a pair of nuclear magnetic resonance signals from said nuclei, each nuclear magnetic resonance signal having a frequency nominally equal to the Larmor frequency of the kind of nuclei from which it is derived, a first oscillation generator producing a first output signal having a frequency substantially equal to the Larmor frequency of one of said kinds of nuclei, a second oscillation generator producing a second output signal having a frequency substantially equal to the Larmor frequency of the other of said kinds of nuclei, means having said first output signal and the magnetic resonance signal of similar frequency impressed thereon and producing an error signal therefrom the magnitude and sense of which is proportional to the magnitude and sense of the phase difference of said impressed signals, means actuated by said error signal varying the frequency of one of said impressed signals by an amount such as to reduce said phase displacement to zero and simultaneously adjusting the frequency and phase of the other nuclear magnetic resonance signal by an amount which is proportional to the ratio of the nuclear constants of said two kinds of nuclei, and means having said second output signal and said other nuclear magnetic resonance signal impressed thereon and producing a system output signal from the phase comparison thereof.

11. A gyroscope comprising means for producing a unidirectional magnetic field having a selected direction, a single sample of fluid material containing two selected kinds of atomic nuclei positioned in said magnetic field, means for producing a pair of nuclear magnetic resonance signals from said nuclei, each nuclear magnetic resonance signal having a frequency nominally equal to the Larmor frequency of the kind of nuclei from which it is derived, a first oscillation generator producing a first output signal having a frequency substantially equal to the Larmor frequency of one of said kinds of nuclei, a second oscillation generator producing a second output signal having a frequency substantially equal to the Larmor frequency of the other of said kinds of nuclei, phase comparison means having said first output signal and the nuclear magnetic resonance signal of similar frequency impressed thereon and producing an error signal therefrom the magnitude and sense of which is proportional to the magnitude and sense of the phase difference of said impressed signals, negative feedback loop means actuated by said error signal controlling the strength of said magnetic field to change the phase of said nuclear magnetic resonance signal of similar frequency to equal the phase of said first output signal, said negative feedback loop means simultaneously adjusting the phase of the other said nuclear magnetic resonance signal by an amount which is proportional to the ratio of the nuclear constants of said two kinds of nuclei, and means having said second output signal and said other nuclear magnetic resonance signal impressed thereon and producing a system output signal from the phase comparison thereof.

References Cited in the file of this patent

UNITED STATES PATENTS

| | | |
|---|---|---|
| 2,720,625 | Leete | Oct. 11, 1955 |
| 2,837,649 | Hershberger | June 3, 1958 |
| 2,841,760 | Hansen | July 1, 1958 |
| 2,922,947 | Bloom et al. | Jan. 26, 1960 |

FOREIGN PATENTS

| | | |
|---|---|---|
| 1,174,136 | France | Nov. 3, 1958 |
| 1,180,455 | France | Dec. 29, 1958 |

OTHER REFERENCES

Holahan: Space/Aeronautics, vol. 31, May 1959, pp. 130–133.

Bell et al.: Physical Review, vol. 107, No. 6, Sept 15, 1957, pp. 1559 to 1565 incl.

Baker et al.: The Review of Scientific Instruments, vol. 28, No. 5, May 1957, pp. 313 to 321.

Smaller: Physical Review, vol. 83, No. 4, August 1951, pp. 812 to 820.

Levinthal: Physical Review, vol. 78, No. 3, May 1, 1950, pp. 204 to 213 incl.